(12) United States Patent
Winkler (10) Patent No.: US 9,570,946 B2
(45) Date of Patent: Feb. 14, 2017

(54) STATOR ARRANGEMENT FOR AN ELECTRICAL MACHINE

(75) Inventor: Günther Winkler, Haibach (AT)

(73) Assignee: SIEMENS AKTIENGESELLSCHAFT, München (DE)

(*) Notice: Subject to any disclaimer, the term of this patent is extended or adjusted under 35 U.S.C. 154(b) by 218 days.

(21) Appl. No.: 14/411,318

(22) PCT Filed: Jun. 25, 2012

(86) PCT No.: PCT/EP2012/062214
§ 371 (c)(1),
(2), (4) Date: Dec. 24, 2014

(87) PCT Pub. No.: WO2014/000757
PCT Pub. Date: Jan. 3, 2014

(65) Prior Publication Data
US 2015/0349592 A1    Dec. 3, 2015

(51) Int. Cl.
*H02K 1/18* (2006.01)
*H02K 5/04* (2006.01)

(52) U.S. Cl.
CPC .............. *H02K 1/185* (2013.01); *H02K 5/04* (2013.01); *H02K 2201/15* (2013.01)

(58) Field of Classification Search
CPC ............ H02K 1/185; H02K 5/04; H02K 1/18;
H02K 2201/15; H02K 1/12; H02K 1/148;
Y10T 29/49009; Y10T 29/49; B60L
11/14; B60L 2220/50; B60L 7/12
USPC .............. 310/216.007, 216.008, 216.109, 89
See application file for complete search history.

(56) References Cited

U.S. PATENT DOCUMENTS

| 4,352,037 A * | 9/1982 | Santner ................ F03B 13/105 220/686 |
| 2006/0028087 A1 * | 2/2006 | Ionel ..................... H02K 1/148 310/216.086 |
| 2012/0133145 A1 | 5/2012 | Haran et al. |
| 2013/0082578 A1 | 4/2013 | Winkler |

FOREIGN PATENT DOCUMENTS

| CN | 1043045 A | 6/1990 |
| CN | 201523287 U | 7/2010 |
| CN | 201584828 U | 9/2010 |
| EP | 1384893 A2 | 1/2004 |
| FR | 1325464 A | 4/1963 |

* cited by examiner

*Primary Examiner* — Naishadh Desai
(74) *Attorney, Agent, or Firm* — Henry M. Feiereisen LLC.

(57) ABSTRACT

A stator arrangement for an electrical machine includes a casing element as one component and at least two stator segments, which are arranged in the casing element as further components. One of the components has a feather key groove and another one of the components has a feather key, which corresponds with the feather key groove, for bracing the one component against the other component.

12 Claims, 9 Drawing Sheets

STATOR ARRANGEMENT FOR AN ELECTRICAL MACHINE

CROSS-REFERENCES TO RELATED APPLICATIONS

This application is the U.S. National Stage of International Application No. PCT/EP2012/062214, filed on Jun. 25, 2012, which designated the United States and has been published as International Publication No. WO 2014/000757.

BACKGROUND OF THE INVENTION

The present invention relates to a stator arrangement for an electrical machine. The present invention further relates to an electrical machine with such a stator arrangement.

With very large electrical machines, especially slow-speed torque motors and generators, it is of advantage not to produce the stator package as a complete unit. Therefore the stator package is constructed with windings using a segmentation technique, i.e. in subsegments, which are later installed to form a closed ring. With large direct-drive wind power generators with outer rotors the individual stator segments are installed by means of screwing the stator segments to two large flanges, which are disposed for example on the drive side and the non-drive side. The flange connections are used for torque bracing. In addition the individual stator segments are screwed to one another at the lateral joints. These generators have the advantage that they can provide a relative large amount of space radially inwards for the flange connections.

In particular in electrical machines with inner rotors, i.e. with classic outer stators in a closed housing, the space available is extremely restricted. For this reason such connection of the individual stator segments in compact generators, such as are used example for underwater flow turbines, is not able to be implemented. Furthermore electrical machines with inner rotors for tube mill drives or water power generators with a large diameter are known in which the stator is constructed from individual stator segments. Here however the stator segments are not screwed together in a closed housing.

SUMMARY OF THE INVENTION

The object the present invention is to provide a stator arrangement for an electrical machine of the type stated at the start which can be constructed in a simpler and lower-cost manner.

According to one aspect of the invention, the object is achieved by a stator arrangement for an electrical machine with a housing element as one component and at least two stator segments which are disposed in the housing element, as further components in each case, wherein one of the components has a feather key groove and the other of the components has a feather key (16) corresponding to the feather key groove for supporting the one component on the other component.

According to another aspect of the invention, the object is achieved by an electrical machine with a stator arrangement as set forth above and a rotor which is arranged inside the stator arrangement.

Advantageous developments of the present invention are specified in the dependent claims.

The inventive stator arrangement for an electrical machine comprises a housing element as one component and at least two stator segments which are disposed in the housing element as further components in each case, wherein one of the components has a feather key groove and the other component has a feather key corresponding to the feather key groove for bracing the one component on the other component.

The individual stator segments, in the assembled state, form the stator of the electrical machine. The housing element in this case can be the complete housing of the electrical machine or it can be a part of the housing. In this case the stator arrangement comprises at least two stator segments. The stator arrangement can also comprise more stator segments. In particular the number of the stator segments is a multiple of two. At least one feather key is provided on one of the components and at least one feather key groove is provided on the other of the components. This enables the components to be easily positioned in relation to one another.

The use of individual stator segments simplifies the assembly of the stator, especially in electrical machines with large diameters. This means that large and expensive production devices are not needed. For example large systems for impregnation, especially for vacuum-pressure impregnation of the stator segments are not needed. This enables cost savings to be made in the production of the electrical machine.

Preferably the housing element has at least two feather keys, wherein the housing element is embodied essentially in the shape of a hollow cylinder and the feather keys each extend on the inside of the housing element in the axial direction. The feather keys can be produced as a separate component and disposed on the inner side of the housing element. For example the feather keys can be fastened to the housing by means of screw connections. This enables a feather key to be provided in a simple manner.

In a form of embodiment each of the stator segments has at least one feather key groove, wherein each of the stator segments essentially has the shape of a hollow cylinder segment and the at least one feather key groove extends on the outer surface of the stator segment in the axial direction. The feather key groove is fastened to the outer surface of the stator segment which is opposite the inner side of the housing element. Preferably the feather key groove is disposed centrally on the outer surface.

The interaction of the feather keys in the housing element and the respective feather key grooves of the stator segments enables a reliable transmission of the torque from the stator to the housing element or the housing of the electrical machine to be made possible. The required torques are transmitted by means of a positive fit between the feather keys and the feather key groups. The end-face side flange connections currently used can thus be dispensed with.

In one embodiment, in the correctly mounted state, a space is formed between the stator segments in which a strip element is disposed. The side surfaces of the stator segments or the joints, which are opposite one another in the installed state, are embodied or shaped such that a space is embodied. In this case a recess can also be made in each case in only one the area of the opposing sides. The recess can also be provided by chamfering the side surfaces. A space is thus created in which a strip element can be disposed.

Preferably the space and the strip element are embodied such that, by applying a force directed in the radial direction outwards to the respective strip element, a force essentially directed in the circumferential direction is created by the strip element on the stator segments. By the application of the force the strip element is moved in the radial direction towards the housing element. The strip element presses against the two stator segments between which it is disposed. The shape of the respective recesses in the stator segments and the strip element has the effect that the pressure of the strip elements against the stator segments means that a force is directed onto the stator segments which is essentially directed in the circumferential direction. In other words the two stator segments are pushed away from one another by the strip element in the circumferential direction. The stator segments which are braced with the strip elements form a type of circular vault which can be pressed with an adjustable pressure into the housing element. A corresponding setting of the respective force on the strip elements enables production tolerances of the stator segments and the housing element to be compensated for in a simple manner.

In a further form of embodiment the strip elements which adjoin the same stator segment have a different force applied to them. A first force is applied to each second strip element and a second force is applied to the strip elements lying between said elements in each case. In this case the amount of the first force is greater than the amount of the second force. Of the two strip elements which are assigned to a stator segment a large force is applied to one element and a smaller force is applied to the other element. The feather keys and the feather key grooves usually have production tolerances. The feather keys and the associated feather key grooves can also be embodied so that they have play. On the side which is facing towards the strip element to which a large force is applied a positive connection is produced between the feather key and the feather key groove. On the side which is facing towards the strip elements to which a small force is applied play is produced between the feather key and the feather key groove. The torque bracing thus occurs in one direction through half of the feather keys and the torque bracing in the other direction occurs through the other feather keys in each case. This enables the production tolerances to be compensated for in a simple manner.

The fastening of the stator segments by means of the feather keys and feather key grooves as well as the pressing in of the stator segments by the strip elements enables a space-saving arrangement to be achieved. In particular a smaller radial mounting space is needed compared to currently known flange connections at the joints of the stator segments, as are used for example in direct-drive wind power systems. In addition the effort of screwing together the segments is greatly reduced. This arrangement makes it possible to install the stator segments inside a closed housing. Thus the standard desired protection types for closed machines, e.g. with surface cooling, are able to be realized for electrical machines.

Furthermore it is advantageous for the respective force which is applied to the strip element to be able to be adjusted by means of a clamping facility with which the strip element is held on the housing element. In such cases a clamping facility is provided for each of the strip elements. The clamping facility with which the strip element is attached to the housing element can comprise at least one screw.

Preferably the strip element is held on the housing element with a number of screw connections. The screws can pass through holes in the housing element from the outer side of the housing element into the inner space of the housing element, wherein the screw heads are disposed on the outer side of the housing element. The strip elements can have corresponding threads into which the screws are turned. A collar can be positioned between the outer side of the housing element and the screw head. With the clamping facility the force acting on the strip element or the tightening torque can be easily adapted.

In one embodiment a cross-sectional surface of the space narrows in the radial direction of the stator segment outwards. In this case the cross-sectional surface running at right angles to the axial direction in which the space extends can have a cross-section narrowing towards the outside. With such a shape of the space a displacement of the respective stator segments in the circumferential direction can be achieved by a strip element which is moved in a radial direction outwards.

Preferably the strip element is embodied in the shape of a rod with an essentially round cross-sectional surface. A strip element thus embodied can be produced simply and at low cost. In addition the bending torque acting on the screws of the clamping facility can be reduced by a strip element with a round cross-sectional surface.

The inventive electrical machine comprises the previously described stator arrangement and a rotor which is disposed within the stator arrangement. The electrical machine is embodied as an inner rotor. The stator arrangement enables electrical machines having a diameter of several meters to be produced by simply screwing them together.

The advantages and developments described above in conjunction with the inventive stator arrangement can be transferred in the same manner to the inventive electrical machine.

BRIEF DESCRIPTION OF THE DRAWING

The present invention is explained below in greater detail with reference to the enclosed drawings, in which.

DETAILED DESCRIPTION OF PREFERRED EMBODIMENTS

The exemplary embodiments explained in greater detail below represent preferred exemplary embodiments of the present invention.

Figure 1:
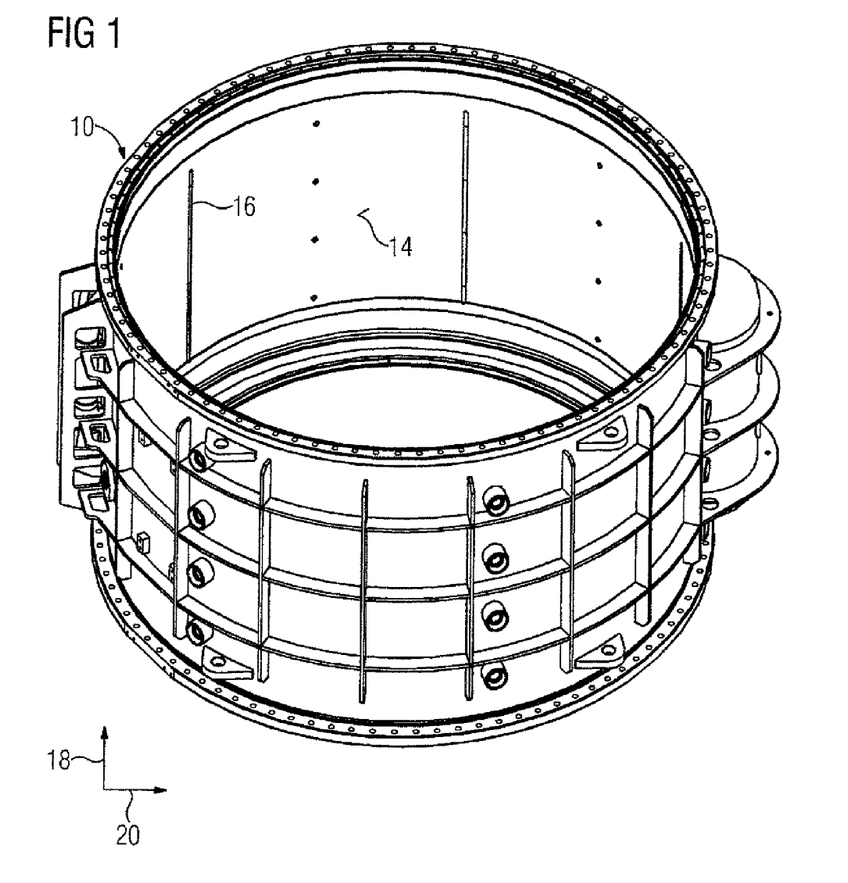
FIG. 1 shows a housing element of a stator arrangement for an electrical machine in a perspective view.

FIG. 1 shows a housing element 10 of a stator arrangement 12 of an electrical machine in a perspective diagram. The housing element 10 essentially has the form of a hollow cylinder. The housing element 10 is preferably made of a metal, especially steel. The housing element 10 is used to arrange an outer stator of a rotary electrical machine. Feather grooves 16 are arranged on the inner side 14 or inner surface of the housing element 10. The feather keys 16 extend at least partly in an axial direction 18 of the housing element 10 or the stator arrangement 12.

Figure 2:
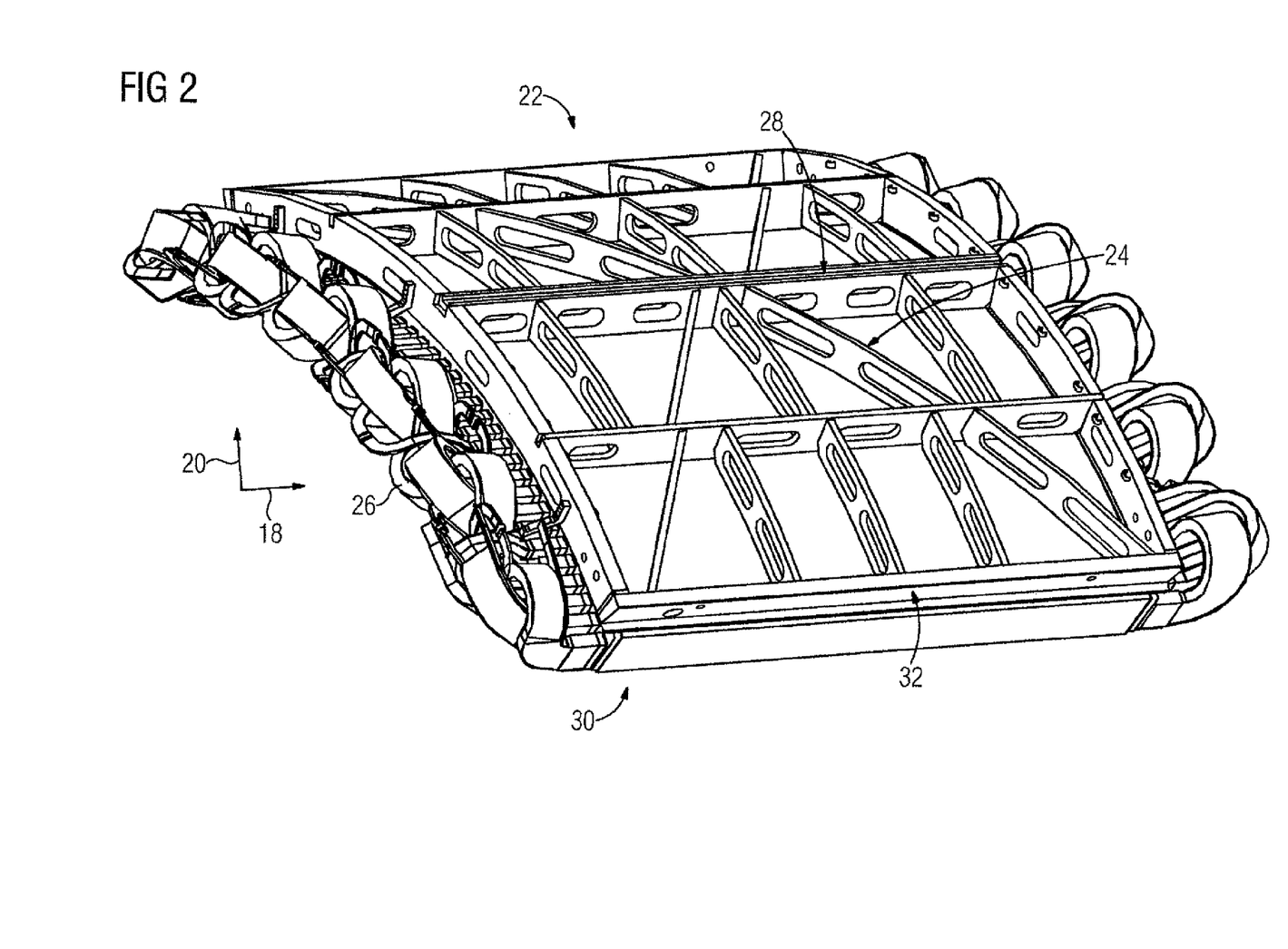
FIG. 2 shows a stator segment of the stator arrangement in a perspective view.

FIG. 2 shows a stator segment 22 of the stator arrangement 12 in a perspective diagram. The stator arrangement 12 comprises at least two of the stator segments 22, which in the state built into the housing element 10 form the stator of the electrical machine. The stator segment 22 essentially has the form of a hollow cylinder segment. The stator segment 22 has a carrier structure 24, which is formed from a number of webs. The webs can be made of an appropriate metal. The carrier structure 24 serves as a retaining structure for the welded-on layered laminated core of the stator segment 22. In addition the carrier structure 24 has winding heads 26 for the windings of the stator.

Furthermore the stator segment 22 comprises a feather key groove 28 which extends in the axial direction 18 of the stator segment 22 or the stator arrangement 12. In this instance the feather key groove 28 is inserted into one of the webs, for example by means of a milling method. A recess 32 is provided on the side surfaces 30 of the carrier structure 24 or impact points which are opposite the stator segments 22 in the state in which the structure is built into the housing element 10, the purpose of which is explained in greater detail below.

Figure 3:
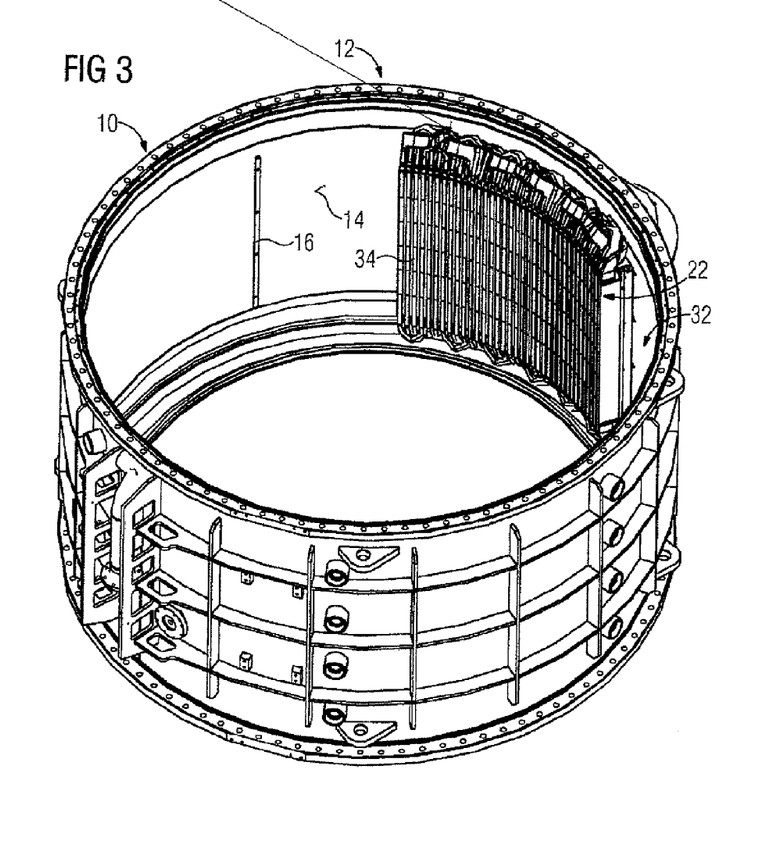
FIG. 3 shows the stator arrangement with one stator segment installed.

FIG. 3 shows a stator arrangement 12 with a built-in stator segment 22. This figure also shows the windings 34 of the stator segment 22. The stator segments 22 are arranged in the housing element 10 so that the feather key 16 of the housing element 10 engages in the respective feather key groove 28 of the stator segment 22. Through the interaction of the feather key 16 and the feather key groove 28 a torque support in the circumferential direction 54 can be made possible. The housing element 10 can be embodied so that the stator segments 22 are supported in the axial direction 18.

Figure 4:
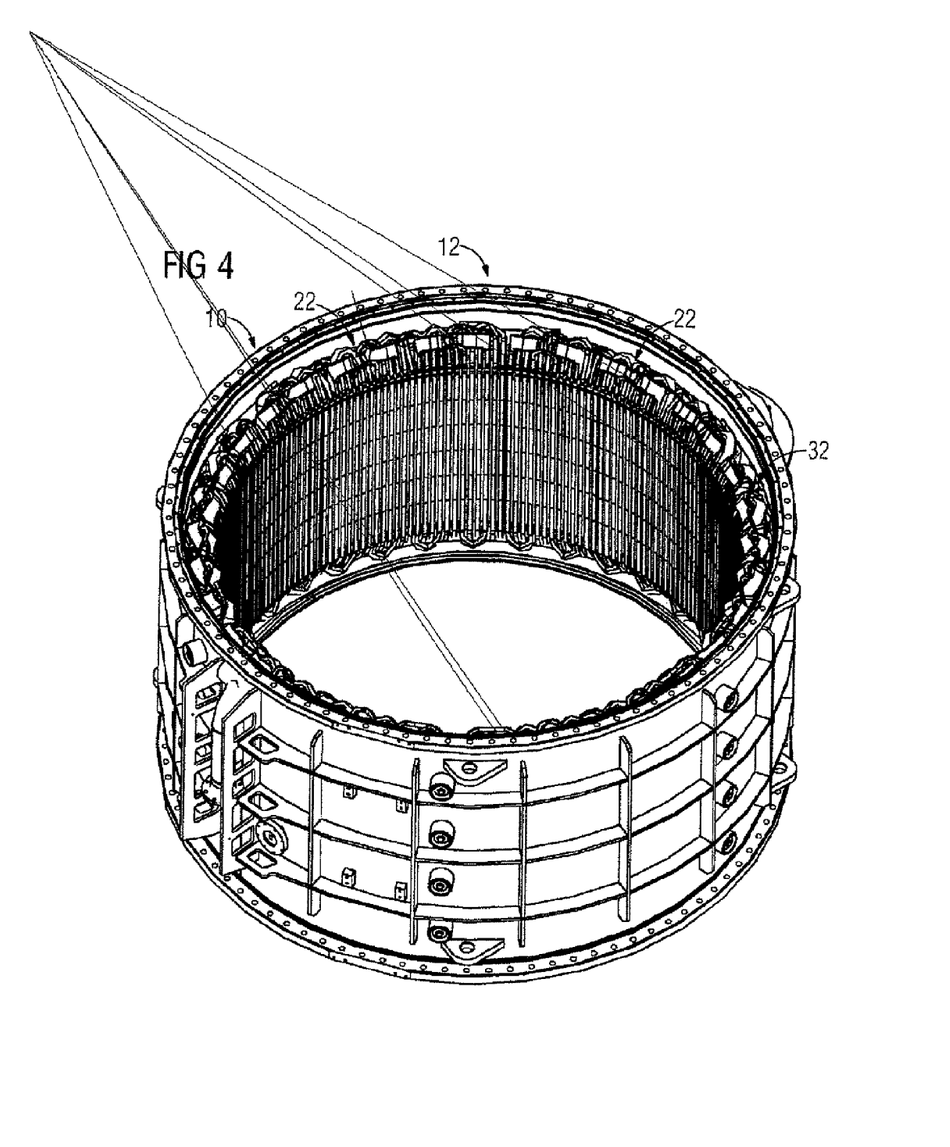
FIG. 4 shows the stator arrangement in which all stator segments are installed.

FIG. 4 shows a stator arrangement 12 in accordance with FIG. 3, in which all stator segments 22 are built into the housing element 10. In the present exemplary embodiment the stator arrangement 12 comprises six stator segments 22. In the installed state stator segments 22 are to be connected to one another.

Figure 5:
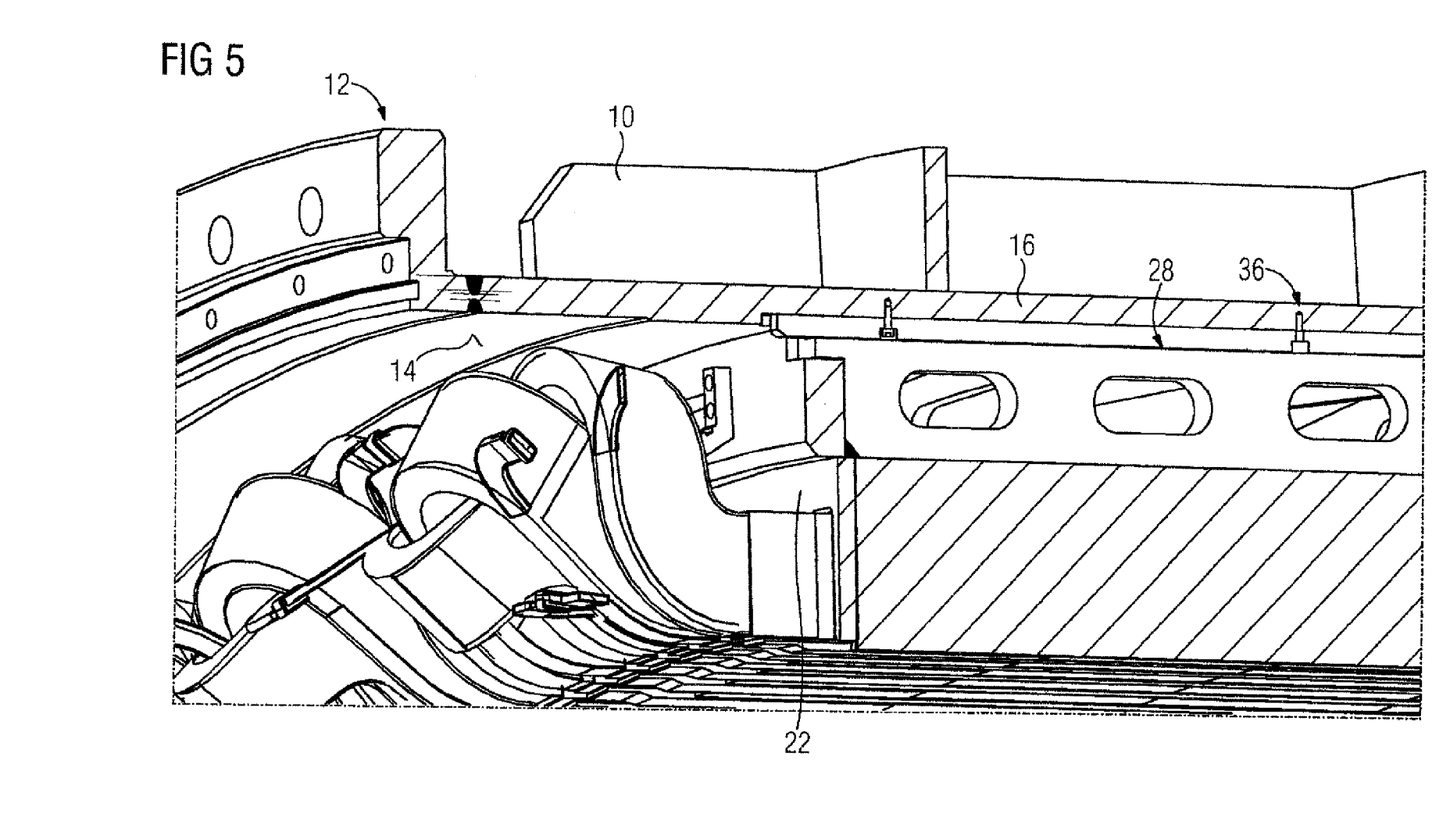
FIG. 5 shows the stator arrangement in a cross-sectional perspective view.

FIG. 5 shows the stator arrangement 12 in a cross-sectional perspective diagram in which the feather key 16 and the feather key groove 28 are shown in more detail. The feather key 16 is attached via a number of screw connections 36 to the inner side 14 of the housing element 10. For this purpose holes are provided in the feather key 16 through each of which a screw is introduced into a thread in the housing element 10.

Figure 6:
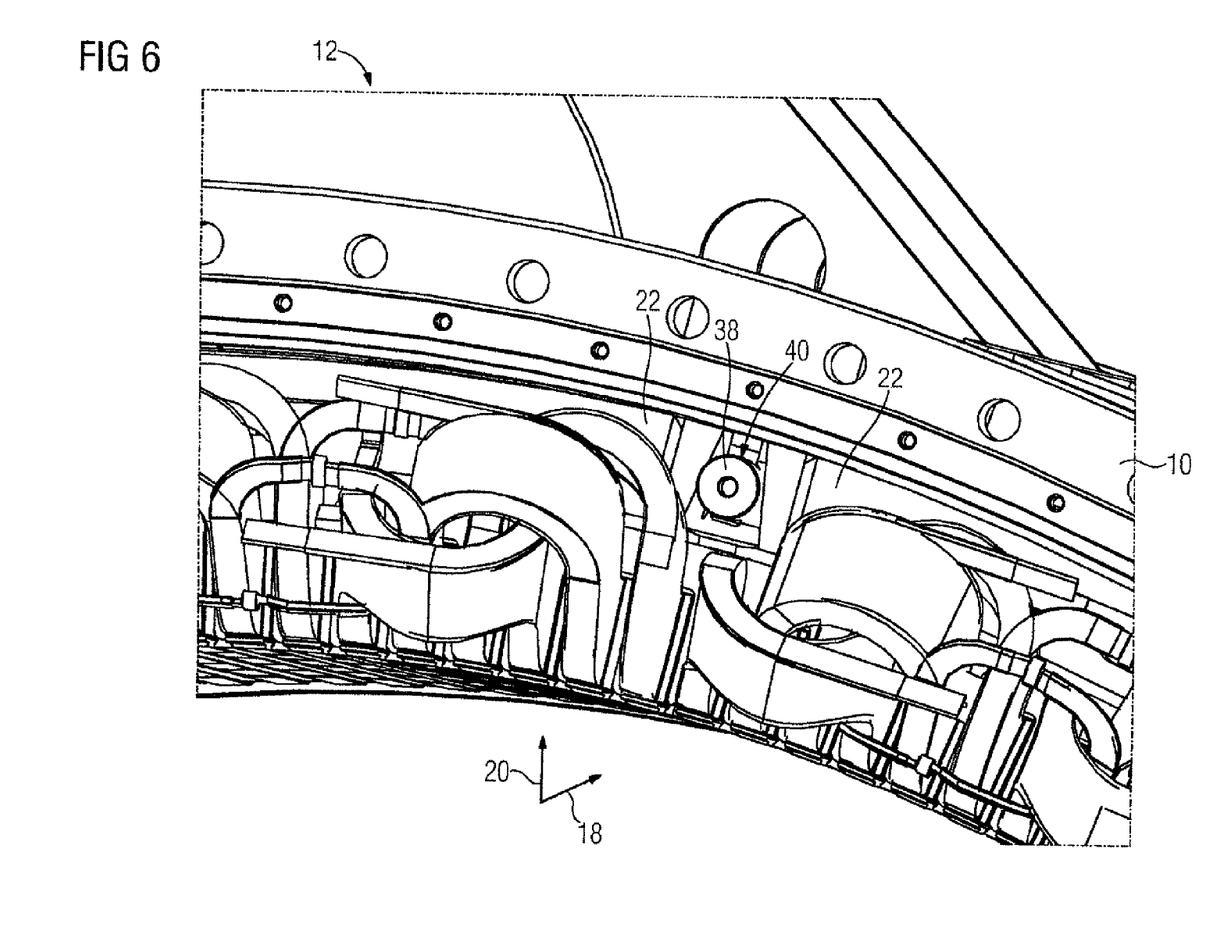
FIG. 6 shows a stator arrangement in a perspective view shown in sections.

FIG. 6 shows an enlarged perspective view of the stator arrangement 12, in which a strip element 38 is shown. The strip element 38 has a round cross-sectional surface in the present exemplary embodiment. The strip element 38 is disposed in a space 40 which is formed by the recesses 32 of the neighboring stator segments 22. The recesses 32 are embodied such that the space narrows in the radial direction 20 outwards, i.e. in the direction of the housing element 10.

Figure 7:
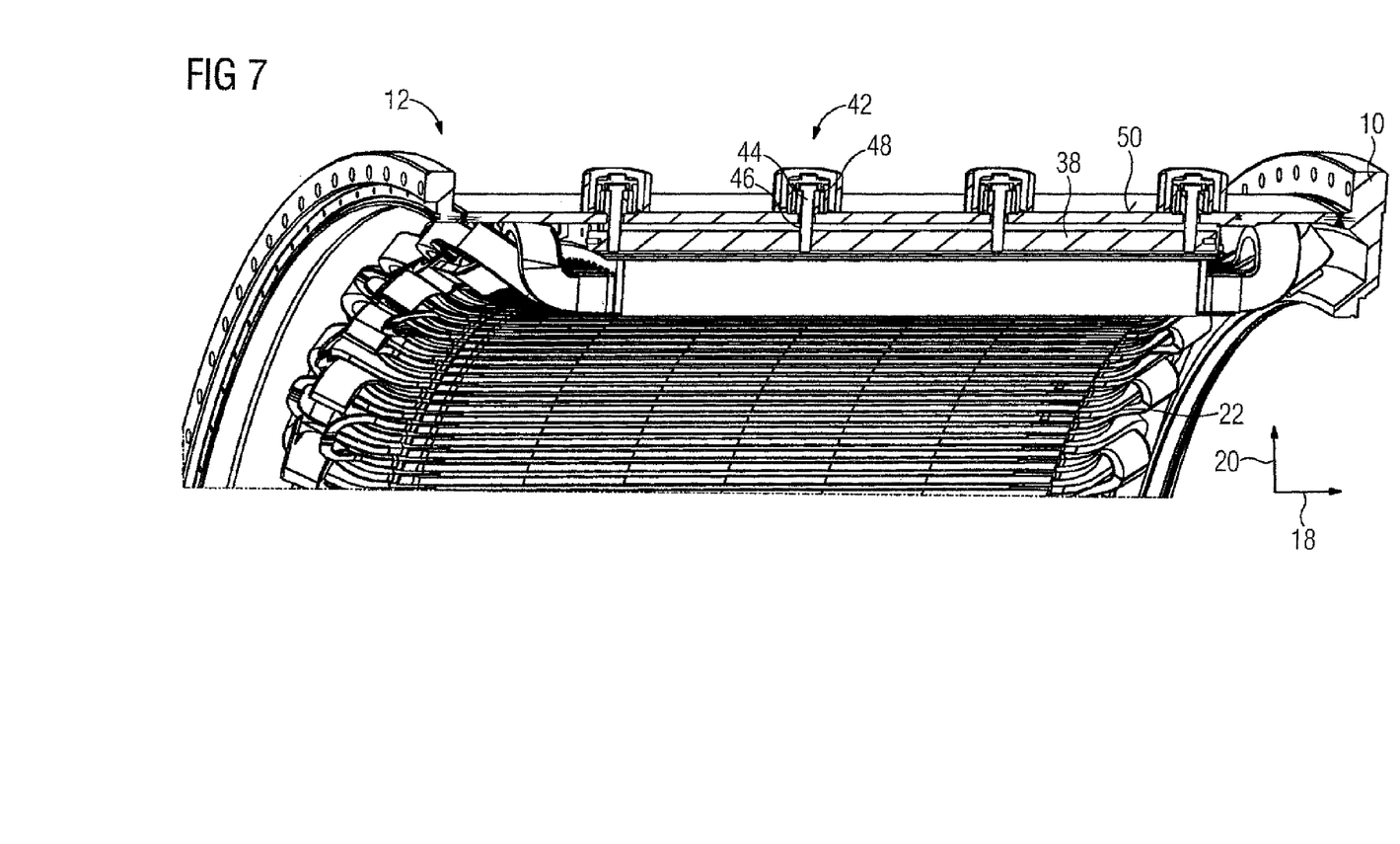
FIG. 7 shows the stator arrangement in a further cross-sectional perspective view.

FIG. 7 shows a sectional perspective view of the stator arrangement 12 in which the strip element 38 is shown in greater detail. The strip element 38 is disposed on the inner side 14 of the housing element stop in this case the strip element 38 extends in the axial direction 18 of the housing element 10 or of the stator arrangement 12. The strip element 38 is attached with a clamping device 42 to the housing element 10. The clamping devices 42 comprise four screws 44 in the present exemplary embodiment, which are passed through the respective holes 46 or cutouts of the housing element 10.

Each of the screws 44 is passed through a sleeve 48. The sleeve 48 is disposed between the outer side 50 of the housing element 10 and the head of the screw 44. A thread 52 is provided in the strip elements 38 in each case into which the screw 44 is screwed. Screwing in the screw 44 enables the position of the strip elements 38 to be changed in the radial direction 20 of the stator arrangement 12.

Figure 8:
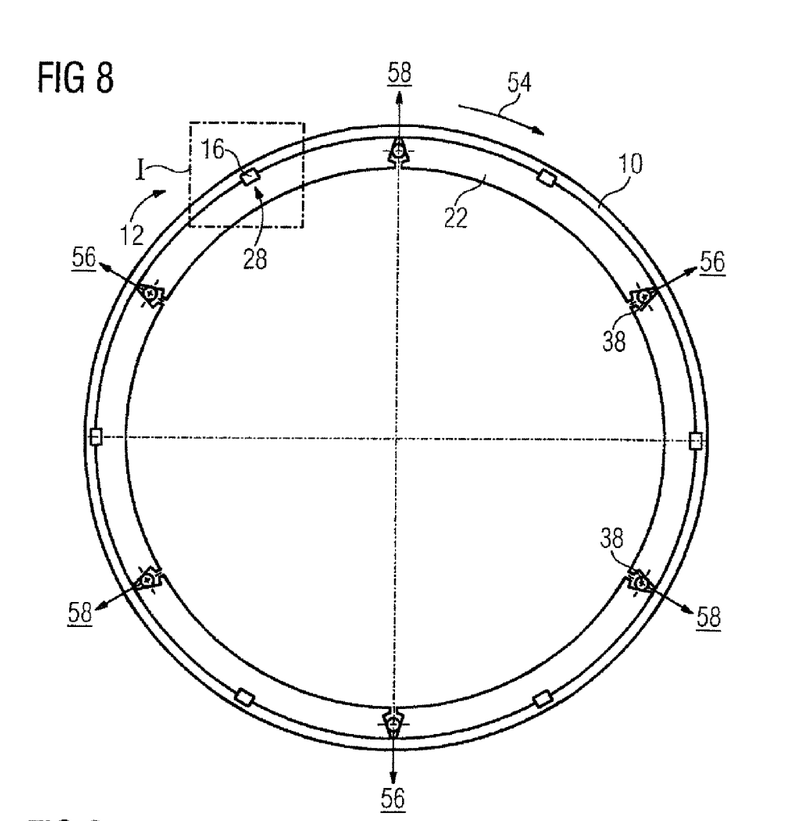
FIG. 8 shows the stator arrangement in a sectional view from the side.

FIG. 8 shows the stator arrangement 12 in a sectional side view. It is illustrated in this figure that the clamping device 42 in the circumferential direction 54 of the stator arrangement 12 alternately has a high and a comparatively lower tightening torque applied to it. The clamping devices 42, which are identified in FIG. 8 with an arrow 56, have a lower tightening torque applied to them. The clamping devices 42, which are identified in FIG. 8 with an arrow 58 have a higher tightening torque applied to them by comparison with the clamping devices 42 identified with an arrow 56. The radial position of the strip element 38 is adjusted via the respective tightening torque of the clamping device 42 or by the force applied to the clamping device 42. The tightening torque is increased with the number of terms with which the screw 44 is screwed into the thread 52 of the strip elements 38.

If a strip element 38 is moved by means of the clamping device 42 in a radial direction 20 in relation to the housing element 10, the strip element 38 presses against the surfaces of the recesses 32 of the stator segments 22 lying opposite it in the circumferential direction 54. Through the shape of the recesses 32 a force is created by the strip element 38 on the two stator segments 22 which is essentially directed in the circumferential direction 54 of the stator arrangement 12. In other words the two stator segments 22 are pushed away from one another in the circumferential direction 54 by the strip element 38 located between them.

Figure 9:
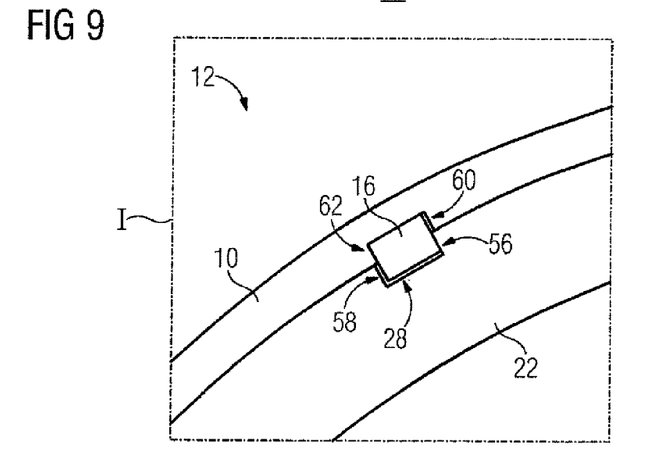
FIG. 9 shows an enlarged diagram in accordance with FIG. 8.

Of the two strip elements 38 which adjoin the same stator segment 22 one has a high force or a high tightening torque applied to it whereas the other has a low force or a lower tightening torque applied to it. The displacement of the stator segments 22 caused thereby is shown in FIG. 9, which shows a detailed view of the area I from FIG. 8. The result of this is that in a first area 56 between the side surfaces of the feather keys 16 and the feather key groove 28 which essentially run at right angles to the circumferential direction 54, a positive connection is embodied. In this case the first area 56 of the arrangement of feather key 16 and feather key groove 28 faces towards the strip element 38 to which a high tightening torque is applied. In the area 58 of the arrangement of feather key 16 and feather key groove 28, which faces towards the strip element 38 to which a lower tightening torque is applied, a fit with play is produced between the side surfaces of the feather key 16 and the feather key groove 28 which essentially run at right angles to the circumferential direction 54. The complete torque transfer from the curved section consisting of the stator segments 22 to the housing element 10 then only occurs via half the feather keys 16 in one torque direction via the other feather keys 16 in the other torque direction.

In the exemplary embodiment shown in FIG. 9 the feather key groove 16 and the associated recess 64 in the housing 10 are embodied to have a fit in relation to one another which allows play. In an area 60 of the arrangement of feather key 16 and recess 64 which area faces towards the strip element 38 to which a high force is applied, play is produced between the side surface of the feather keys 16 and side surface of the recess 64 which essentially run right angles to the circumferential direction 54. In the area 62, which faces towards the strip element 38, to which a lower force is applied, a play-free positioning is produced between the side surface of the feather key 16 and the side surface of the recess 64. This enables all production tolerances to be compensated for in a simple manner.

Figure 10:
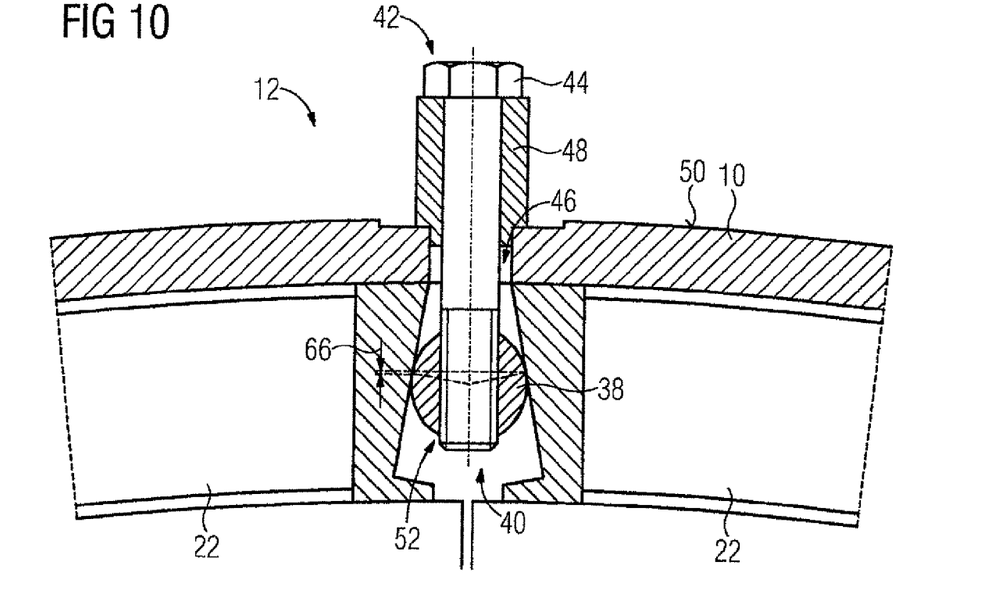
FIG. 10 shows a clamping facility of the stator arrangement in a sectional view from the side.
Figure 11:
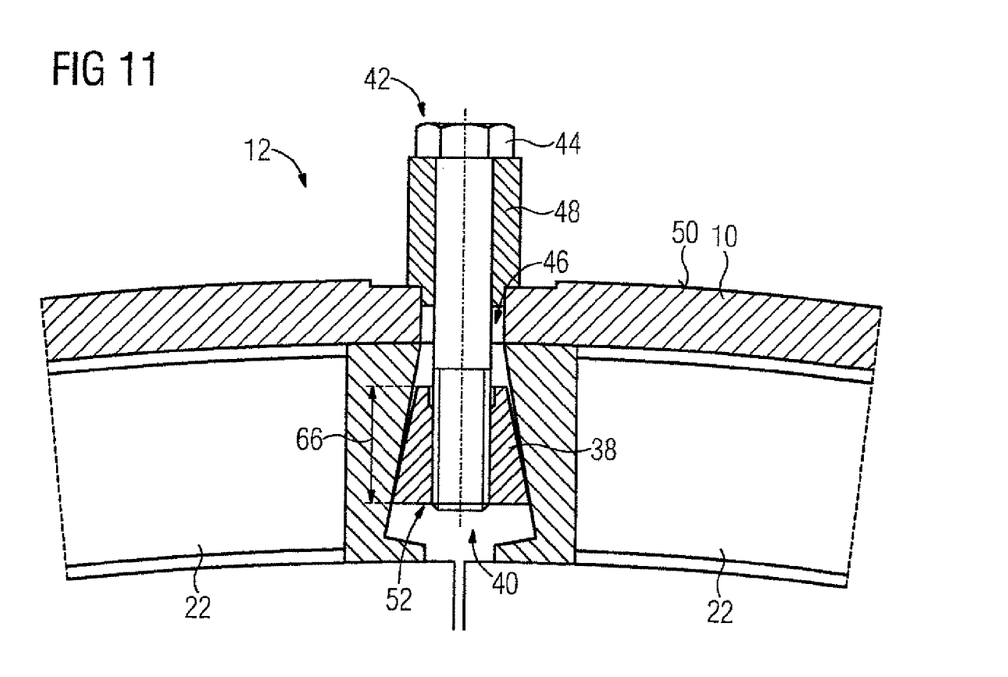
FIG. 11 shows a clamping facility of the stator arrangement in accordance with FIG. 10 in a further form of embodiment.

FIG. 10 shows a clamping device 42 in a detailed view. The strip element 38 has a round cross-sectional surface. The geometrical embodiment of the strip element 38 and the space 40 between the two stator segments 22 produces a lever length 66, which corresponds to the lever of the bending torque acting on the screw 44. With the use of the strip element 38 with a round cross-sectional surface a smaller lever length six is produced and thus a smaller bending torque which acts on the screw 44. By comparison FIG. 11 shows a clamping device 42 in a further embodiment, in which the strip element 38 has a trapezoidal cross-sectional surface. As can be seen in FIG. 11, with a trapezoidal strip element 38 by comparison with a round strip element 38 a considerably larger lever length 66 and thus higher bending torque, which acts on the screw 44, is produced.

What is claimed is:

1. A stator arrangement for an electrical machine, comprising:
   a housing element as a first component;
   at least two stator segments as a second component disposed in the housing element, wherein one of the first and second components has a feather key groove and another one of the first and second components has a feather key which complements the feather key groove for supporting the first component on the second component, and
   a strip element disposed in a space formed between the stator segments, when the at least two stator segments are installed, the space and the strip element being configured such that a force directed in substantial circumferential direction is generated from the strip element to the stator segments when the strip element is acted upon by a force that is directed outwards in a radial direction,
   wherein strip elements adjoining a same one of the stator segments have a different force applied to them.

2. The stator arrangement of claim 1, wherein the housing element has at least two of said feather key and is configured substantially in the shape of a hollow cylinder, said feather keys extending on an inner side of the housing element in an axial direction.

3. The stator arrangement of claim 1, wherein each of the stator segments has at least one of said feather key groove and is configured substantially in the shape of a hollow cylinder segment, said at least one feather key groove extending on an outer surface of the stator segment in an axial direction.

4. The stator arrangement of claim 1, further comprising a clamping device configured to apply the force upon the strip element and to hold the strip element on the housing element.

5. The stator arrangement of claim 1, wherein the space has a cross-sectional surface which narrows outwards in the radial direction of the stator segments.

6. The stator arrangement of claim 1, wherein the strip element has a rod-shaped configuration with an essentially round cross-sectional surface.

7. An electrical machine, comprising:
   a stator arrangement including a housing element as a first component, at least two stator segments as a second component disposed in the housing element, wherein one of the first and second components has a feather key groove and another one of the first and second components has a feather key which complements the feather key groove for supporting the first component on the second component; and a strip element disposed in a space formed between the stator segments, when the at least two stator segments are installed, the space and the strip element being configured such that a force directed in substantial circumferential direction is generated from the strip element to the stator segments when the strip element is acted upon by a force that is directed outwards in a radial direction, wherein strip elements adjoining a same one of the stator segments have a different force applied to them; and
   a rotor arranged inside the stator arrangement.

8. The electrical machine of claim 7, wherein the housing element has at least two of said feather key and is configured substantially in the shape of a hollow cylinder, said feather keys extending on an inner side of the housing element in an axial direction.

9. The electrical machine of claim 7, wherein each of the stator segments has at least one of said feather key groove and is configured substantially in the shape of a hollow cylinder segment, said at least one feather key groove extending on an outer surface of the stator segment in an axial direction.

10. The electrical machine of claim 7, wherein the stator arrangement has a clamping device configured to apply the force upon the strip element and to hold the strip element on the housing element.

11. The electrical machine of claim 7, wherein the space has a cross-sectional surface which narrows outwards in the radial direction of the stator segments.

12. The electrical machine of claim 7, wherein the strip element has a rod-shaped configuration with an essentially round cross-sectional surface.

* * * * *

UNITED STATES PATENT AND TRADEMARK OFFICE
CERTIFICATE OF CORRECTION

| | | |
|---|---|---|
| PATENT NO. | : 9,570,946 B2 | Page 1 of 1 |
| APPLICATION NO. | : 14/411318 | |
| DATED | : February 14, 2017 | |
| INVENTOR(S) | : Günther Winkler | |

It is certified that error appears in the above-identified patent and that said Letters Patent is hereby corrected as shown below:

On the Title Page

Column two, under FOREIGN PATENT DOCUMENTS, please correct "CN 201523287 U" to read --CN 201523267 U--.

Signed and Sealed this
Twenty-fifth Day of April, 2017

Michelle K. Lee
*Director of the United States Patent and Trademark Office*